US011410186B2

(12) United States Patent
Oberle

(10) Patent No.: US 11,410,186 B2
(45) Date of Patent: Aug. 9, 2022

(54) AUTOMATED SUPPORT FOR INTERPRETATION OF TERMS

(71) Applicant: SAP SE, Walldorf (DE)

(72) Inventor: Daniel Oberle, Durmersheim (DE)

(73) Assignee: SAP SE, Walldorf (DE)

( * ) Notice: Subject to any disclaimer, the term of this patent is extended or adjusted under 35 U.S.C. 154(b) by 344 days.

(21) Appl. No.: 16/874,235

(22) Filed: May 14, 2020

(65) Prior Publication Data

US 2021/0357951 A1    Nov. 18, 2021

(51) Int. Cl.
*G06Q 30/00* (2012.01)
*G06N 20/00* (2019.01)
*G06N 5/04* (2006.01)

(52) U.S. Cl.
CPC ............ *G06Q 30/018* (2013.01); *G06N 5/04* (2013.01); *G06N 20/00* (2019.01)

(58) Field of Classification Search
CPC ........ G06Q 30/018; G06N 5/04; G06N 20/00; G06F 40/284; G06F 40/289; G06F 40/30; G06F 16/953; G06F 16/9566; H04L 41/5054; H04L 51/046; H04L 61/2557; H04L 67/50; H04L 67/75
See application file for complete search history.

(56) References Cited

U.S. PATENT DOCUMENTS

2003/0217052 A1 * 11/2003 Rubenczyk ........... G06F 16/951
2014/0337266 A1   11/2014 Kalns et al.
2017/0075877 A1 *  3/2017 Lepeltier ............... G06F 40/117
2018/0181483 A1    6/2018 Oberle
2020/0097639 A1 *  3/2020 Celia .................... G06F 16/182
2020/0401869 A1 * 12/2020 Baker .................... G06N 20/20

OTHER PUBLICATIONS

Prokofyev et al., "Ontology-Based Word Sense Disambiguation for Scientific Literature", Mar. 24, 2013, Advances in Information Retrieval, Springer Berlin Heidelberg, Berlin, pp. 594-605, 20 pp.
Zeller, Tom, "Detecting Ambiguity in statutory texts", Jan. 1, 2018, Retrieved from the internet: URL:https://elib.uni-stuttgart.de/bitsream/11162/10098/1/BA%20Tom%20Zeller.pdf, 50 pp.
Extended European Search Report, EP Application No. 20202978.1-1231, dated Apr. 20, 2021, 11 pp.

* cited by examiner

*Primary Examiner* — El Hadji M Sall
(74) *Attorney, Agent, or Firm* — Buckley, Maschoff & Talwalkar LLC

(57) ABSTRACT

A system and method including the reception of an input of a set of textual terms including a subject matter parameter value and an indeterminate term parameter value; automatically determining, by a machine learning process, the subject matter parameter value is subsumed within a specified data model including the indeterminate term parameter value; automatically processing the indeterminate term parameter value to execute a combination of literal, systemic, historical perspective, and teleological interpretations thereof to generate an overall assessment that includes a non-arbitrary interpretation of the indeterminate term parameter value; and presenting a representation of the set of textual terms expanded to include the non-arbitrary interpretation of the indeterminate term parameter value.

20 Claims, 15 Drawing Sheets

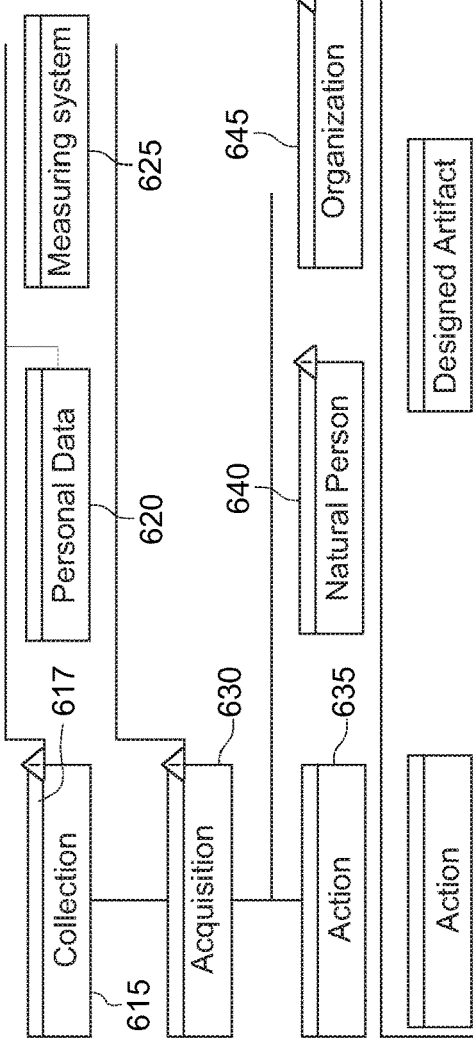
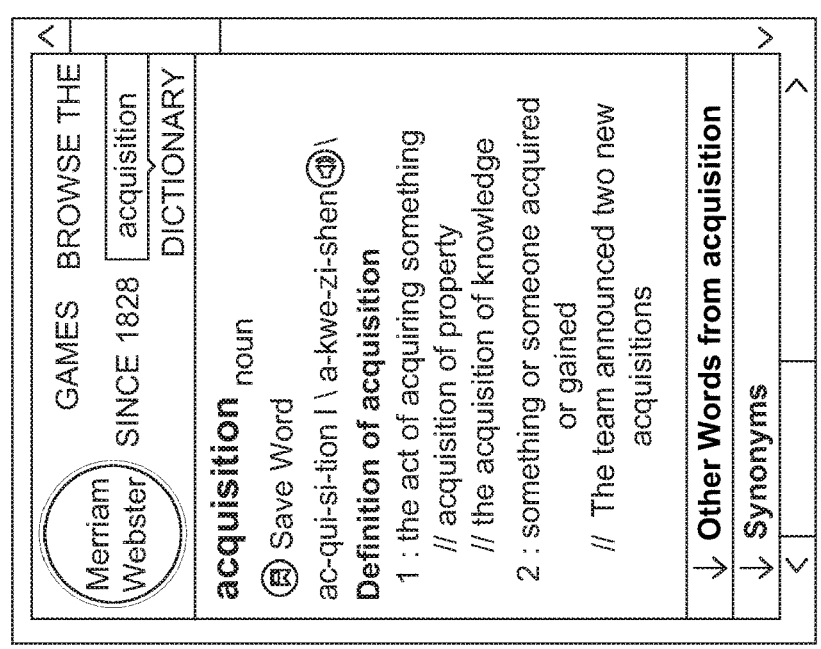
FIG. 6

Legal interpretion: "Collection" in the Energy Act

| Checking sequence | Literal interpretation | Systematic interpretation | Historic interpretation | Objective interpretation | Overall assessment |

You have to decide whether <Acquisition> can be extended by <Design Artifact> as actor according to the original intension of the Energy Act. You have to decide under consideration of the literal, systematic, historic and objective-teleological interpretation elaborated in the previous steps.

— 1305

Please notify your legal department!

OK
No

Yes    Unclear

FIG. 13

AUTOMATED SUPPORT FOR INTERPRETATION OF TERMS

BACKGROUND

There are numerous different regulations, statutes, laws, and specifications related to various different subject matters and entities. Some examples might include regulatory statutes, rules, and laws promulgated by governmental agencies; codes of conduct and/or industry standards that might be instituted and enforced by industry and trade organizations; and rules and by-laws adapted and used by other organizations (e.g., a corporate board of trustees, a social club's governing body, etc.). A common characteristic of these and other types of regulations is that they are each expressed by and represented as textual language. While the various regulations may attempt to clearly specify, define, and/or stipulate rules, restrictions, and conduct (e.g., encouraged or discouraged) for a particular subject matter by using textual terms therein, at least some of the terms used in the regulations might be unclear or vaguely defined within the regulations.

In some regards, the interpretation of a term in a regulation might vary over time as norms and accepted behaviors and practices evolve. In some instances, the common meaning of a term might evolve over time and such changes might be applied to a term within a regulation. The interpretation of a term might also vary when, for example, the original intent and/or purpose of the regulation is forgotten or otherwise minimized after the implementation of the regulation. These and other factors might contribute to terms in a regulation being imprecisely defined and open to different and often conflicting interpretations.

Human experts, such as lawyers and business personnel with appropriate training and/or education (i.e., compliance officers, certified accountants, etc.) may be knowledgeable and versed in interpreting and understanding vague terms in different regulations within their area(s) of expertise. However, such knowledge may be out of reach by many of the people that are subject to or otherwise impacted by the regulations. Whereas the regulations might be relevant to these people, they also might not be equipped to interpret the regulations with any definitive certainty.

Therefore, there exists a need for an automated system and framework for interpreting terms in regulations to obtain a non-arbitrary, definitive interpretation of the terms.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is an illustrative diagram of an outward facing user interface related to a literal interpretation process, in accordance with an example embodiment.

FIG. 13 is an illustrative diagram of an outward facing user interface related to an overall assessment process, in accordance with an example embodiment.

Figure 1:
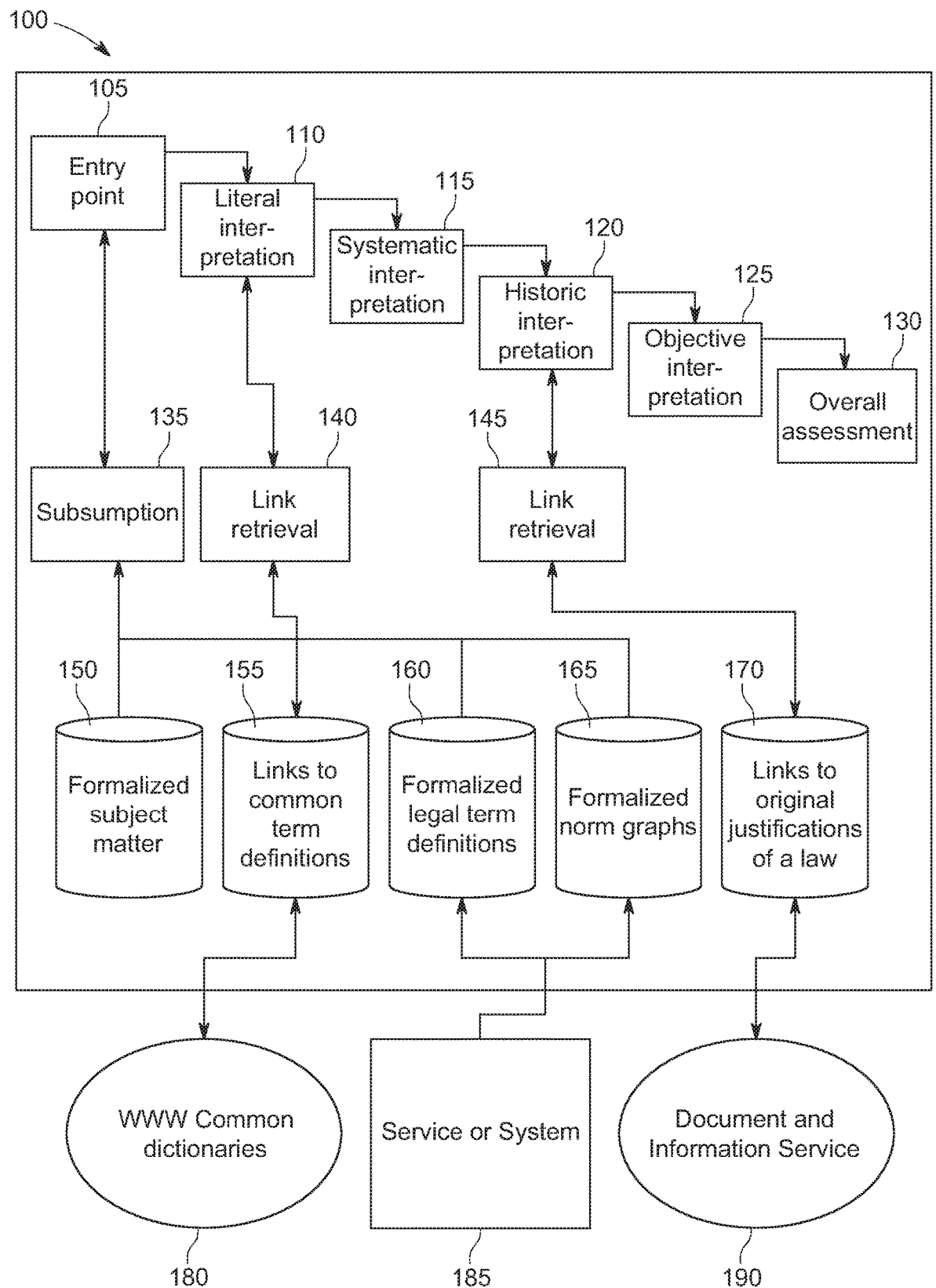
FIG. 1 is a diagram illustrating an overall framework or architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As used herein, various texts, including but not limited to regulations, statutes, laws, codes of conduct, standards, rules, by-laws, and the like may be referred to, at various times and instances, generally as regulations. Various aspects of the present disclosure may be described, at least in part, by way of one or more illustrative examples and embodiments, including descriptive discussions and/or drawings. Unless otherwise stated, the methods, systems, and tangible embodiments of processor-executable code/ instructions disclosed herein may be applied to and encompasses all different types of regulations, not just the types explicitly disclosed in the illustrative examples herein. For example, some aspects of the present disclosure relate to providing a mechanism to generate a non-arbitrary, definitive interpretation for a legal term derived from a statutory regulation and may be described, at least in part, in the context of government issued regulations drafted and enacted by a legislative body to enforce the government's legislation.

In one embodiment, an illustrative example statutory provision might relate to data privacy regulations promulgated by a country or regional governing body that includes a number of terms. In some aspects, one or more of the terms may include legal terms that may be defined in legal articles, paragraphs, clauses, etc. (i.e., norms) comprising the regulations. As an example, consider the legal term "personal data" (e.g., EU General Data Protection Regulation, GDPR) whose definition is as follows.

Art. 4 Definitions

For the purposes of this Regulation:

"personal data" means any information relating to an identified or identifiable natural person ("data subject"); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person;

In some aspects, a distinction may be made between determinate terms and indeterminate terms. Determinate terms are those whose interpretation is exact, having a clear scope and leaves no room for a different meaning (i.e., interpretation). As an example, the term "Age" as used in a regulatory code might simply refer to the length of time an entity has existed. Indeterminate terms have some room for different interpretations. In the example regulation text above, the term "personal data" is an example indeterminate term since it is defined by a number of alternative factors such as, for example, ". . . one or more factors specific to . . . that natural person". In this example, the regulation (i.e., legislation) purposely provides a broad range (i.e., number and type) of specific factors in order to capture different subject matters that may be included in "personal data". In some embodiments it may be a desire or even a requirement (e.g., as required by a "governing" entity) that the interpretation of indeterminate terms (e.g., legal or otherwise) be as non-arbitrary as possible. A methodology may be determined or prescribed for generating, determining, or otherwise generating the non-arbitrary interpretation of the indeterminate term. In accordance with some aspects herein, a system, method, and framework are disclosed that incorporates a methodology to determine non-arbitrary interpretation of indeterminate terms. In one embodiment, the methodology may include applying four different types of interpretations or canons to an indeterminate legal term to generate, if possible, a non-arbitrary interpretation of the indeterminate legal term. In one embodiment, the four types of interpretations or canons may include a literal (semiotic) interpretation that addresses the fact that law is intrinsically connected with language and the wording is a prudent starting point for interpretation. The wording may also be a limitation in some aspects and instances, although it may often represent a significant aspect of what the regulation and the drafters thereof intend.

Another type of interpretation or canon is a systematic interpretation that covers the "union of law" within a regulation and preserves the inner coherence of the regulation such that an interpretation of an indeterminate term of interest does not introduce any contradictions of meaning within the regulation. In some aspects, some regulations might be understood in context with other provisions. In some instances, a term might be referenced in a (e.g., first) statutory definition although the term's definition is in a different norm or even in a different provision. In some instances, a definition for a term might be further specified in a more focused pertinent regulation such as, for example, a local/city/regional regulation.

A third type of interpretation process or canon may be a historical intention interpretation that operates to provide an interpretation of a given indeterminate term based on the intentions of the original (i.e., initial) drafters of the regulation. In some aspects, this type of interpretation may include the historical will (i.e., intentions, desires) of the drafters of the regulation. In some aspects, a regulation might be better understood by considering the relevant circumstances during the time of the adaption of the regulation. The historical interpretation might be represented and documented in historical records of the regulatory entity generating (e.g., legislative) process, such as records documenting discussions during the inception of the regulations.

A fourth type of interpretation or canon in the present example includes an objective-teleological interpretation that recognizes regulations may be generated for one or more specific purposes. In some aspects, it may be significant or informative to be aware of the original idea(s) or purpose(s) embedded in the regulation itself since the interpretation and application of a regulation might evolve or otherwise differ over time. In some aspects, this type of interpretation might be influenced by views, experiences, biases, etc. of the interpreter (e.g. human or machine). Inner coherence of the regulation should be preserved here too. In some aspects, a regulation might be better understood with regard to other provisions.

In some embodiments, applying the four different canons or types of interpretations to an indeterminate term in a regulation might result in a non-arbitrary interpretation given a specific subject matter. For example, if the subject matter features a particular email address (e.g., lastname@company.com) the four interpretation processes introduced above may be applied in combination to answer whether this email address can be considered "personal data" under the regulation including the definition of personal data introduced above.

FIG. 1 is an illustrative example of an overall system architecture or framework 100 that facilitates and supports, at least in part, some of the processes and systems disclosed herein to automatically interpret indeterminate terms to generate a non-arbitrary definition for the term, in some embodiments. In support of the automated aspects of architecture 100, architecture 100 may be supplied or otherwise have access to formalized term definitions including defined terms configured in a specified configuration and formalized norm graphs that include graphical representations of textual content comprising the norm (i.e., provisions of a regulation). These aspects are shown in FIG. 1 at, respectively, 160 and 165. Architecture 100 includes an entry point 105 that receives an input of, for example, representations of textual data from a regulation for which a term therein is to be automatically interpreted by a processor-enabled system, device, or machine. In this manner, the task of interpreting the indeterminate term(s) may be efficiently determined by the system, device, or machine. In some embodiments, a user might provide some input to, for example, initiate an interpretation process (i.e., an indication of the regulation(s) or norm(s) including indeterminate term(s) to be interpreted), provide an indication to continue or abort the interpretation process, and provide an indication in the form of user input to, for example, accept or reject a "final" interpretation of the interpretative process. However, note that the overall interpretative process(es) disclosed herein are primarily automated based on a combination of different interpretation (sub-) processes that are primarily executed automatically without involvement or direction from a user. In this manner, a non-expert might be able to minimally interact with a system or process herein and still obtain the desired, nonarbitrary results of an automated interpretation process herein.

Major aspects of architecture 100 include a combination of components that might implement multiple interpretation canons (i.e., principles) processes that may be executed for each indeterminate term being interpreted. In the example of FIG. 1, four interpretation components are implemented and they include a literal interpretation component 110, a system interpretation component 115, a historic interpretation component 120, and an objective-teleologic interpretation component 125. In some embodiments, the combination of interpretation processes 110, 115, 120, and 125 might be viewed as being executed in a pipeline. The entry point and the interpretation components interface with other components and features of architecture 100, including a subsumption component or service 135 and link retrieval components 140 and 145. In some embodiments one or more data sources including, for example, formalized subject matter 150, links to common term definitions 155, the aforementioned formalized (legal or other domain) term definitions 160 and formalized norm graphs 165, and links to records representing original justifications for a regulation (e.g., law) 170. Where a data source is a "link", indication, or pointer to the location of a source (e.g., uniform resource identifier, URI), then system 100 might interface with one or more data sources (e.g., cloud services or applications) such as, for example, a dictionary of common terms 180, a cloud-based service or system 185 to generate formalized term definitions and formalized norm graphs, and a database or service 190 (e.g., a database provided by a cloud infrastructure database service provider managing historical records related to regulations and the drafters thereof, including, in some instances, data documenting the operation of the organization performing the development of the regulation(s).

Figure 2:
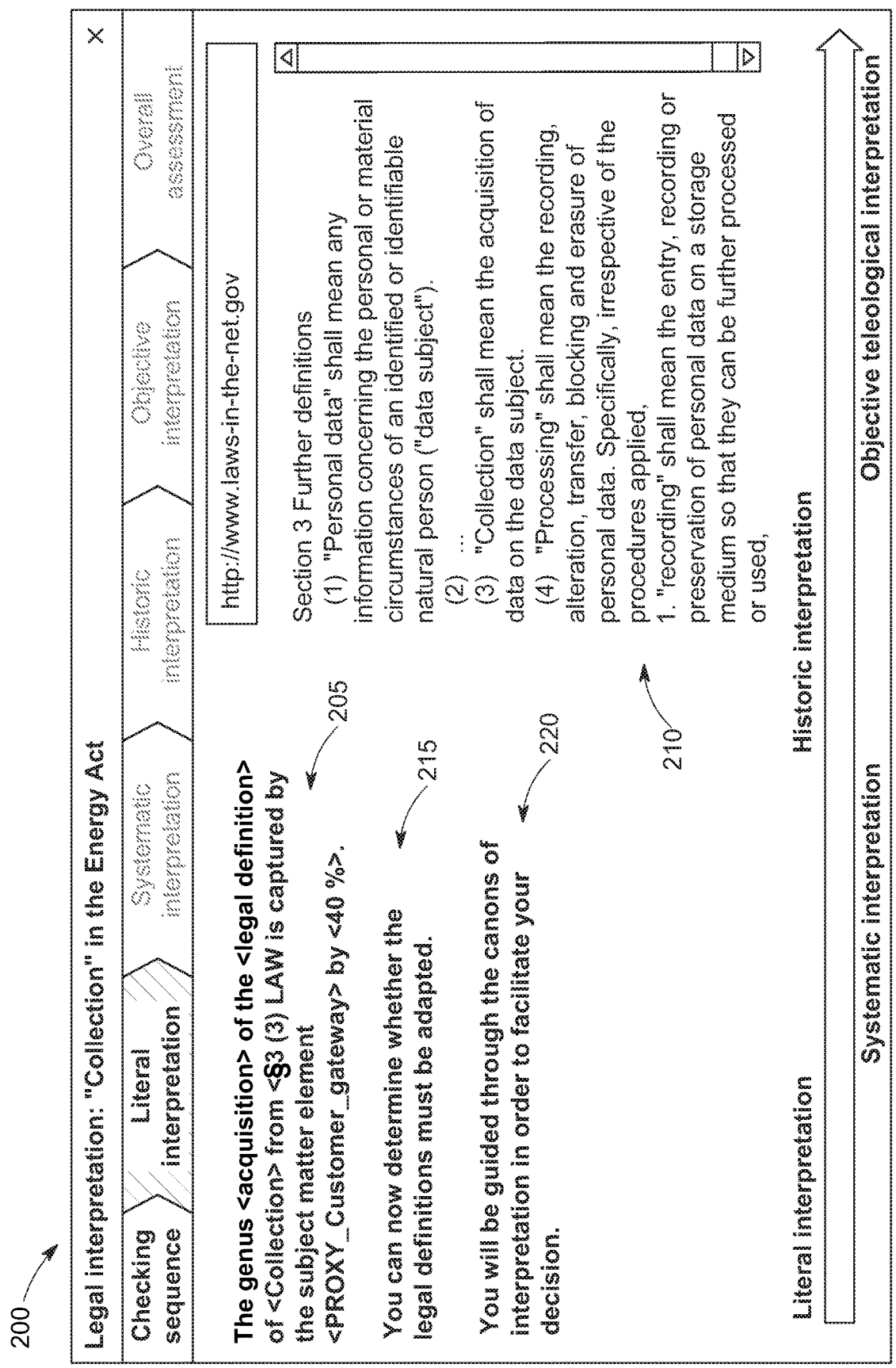
FIG. 2 is an illustrative diagram of an outward facing user interface, in accordance with an example embodiment.

FIG. 2 is an illustrative diagram of an outward facing user interface (UI) 200 that may include a start screen to support entry point 105, in accordance with an example embodiment. The UIs depicted in FIG. 2 and FIGS. 6-14 illustrate various aspects of an automated interpretation system and process herein. In particular, these figures demonstrate aspects of the present disclosure in the context of a smart energy distribution grid that includes a smart meter to monitor and measure energy consumption at a customer location (e.g., residence or business) and report the collected measurements to a provider or operator of the grid for billing, maintenance, and other purposes. In some aspects, data privacy issues might be a concern in a smart grid since smart meters may obtain fine-grained resolution energy consumption data that might reveal personal data regarding a customer. For example, each device (e.g. dishwasher, television, etc.) may have their own consumption idiosyncrasies and an entity such as, for example, the energy provider might be able to determine specific detailed information regarding a customer (e.g., when the dishwasher is operated, when the customer is at home, television viewing habits of the customer, etc.) based on the data obtained by smart meter. Therefore, the smart grid in the example of FIG. 2 may relate to a relevant law (e.g., a country's "Energy Act") that is designed to protect and safeguard an individual's control of their personal data. In FIG. 2, UI 200 includes a listing 205 of the legal term(s) to be interpreted (i.e., "collection") that is vaguely defined in section 3 of the relevant regulation reproduced at 210 (i.e., "Collection" shall mean the acquisition of data on the data subject). In this example, the indeterminate legal term to be interpreted is "collection" of the Energy Act and the subject matter (i.e., real world entity) is the smart meter that collects the energy data. The smart meter is generally represented as "PROXY_Customer_gateway" as shown at 205, wherein an actual smart meter for a customer might include an identifier (e.g., account number) for the customer. UI 200 further informs a user that the legal definition for the term may be adapted (e.g. transformed or pre-processed) for interpretation at 215 and that the system will guide the user through the interpretation canons or processes implemented by the system at 220.

The configuration of the problem at 205 that outlines the correspondence of the indeterminate legal term "Collection" and the subject matter element " PROXY_Customer_gateway" of 40% may be derived by a subsumption process or algorithm. In some aspects, formalizing a norm graph, the legal terms, and the subject matter may be a prerequisite for automating the subsumption process (FIG. 1, 135), in some embodiments herein. As used herein, the subsumption process may determine correspondences between the subject matter and one or more indeterminate legal terms' statutory (i.e., specified) ontologies and applies machine learning thereto to achieve a subsumption result as indicated by the example at 205. In some aspects, textual input to the entry point of system 100 may be structured to include two aspects, a subject matter parameter and an indeterminate term parameter. The input textual terms including values for the subject matter parameter and the indeterminate term parameter may be processed to configure or adapt the input for further processing by a machine learning or artificial intelligence (AI) system or service that automatically determines a subsumption result.

In some aspects, machine learning may be well-suited to determining a corresponding representation in the legal (in this example) norms for a given subject matter. Consider a simple but illustrative example where the regulation is a country's data privacy law that vaguely or indeterminately defines the term "personal data", and the subject matter is the personal email address of an individual (e.g., lastname@company.com). Using this example, a subsumption process herein may perform a determination of whether the subject matter (e.g., lastname@company.com) is subsumed within or underneath the indeterminate legal term of "personal data" specified in the regulation (e.g., law). In some embodiments, the machine learning aspects of the subsumption process herein might operate to automatically determine or generate one or more deterministic subsumption relations.

Figure 3:
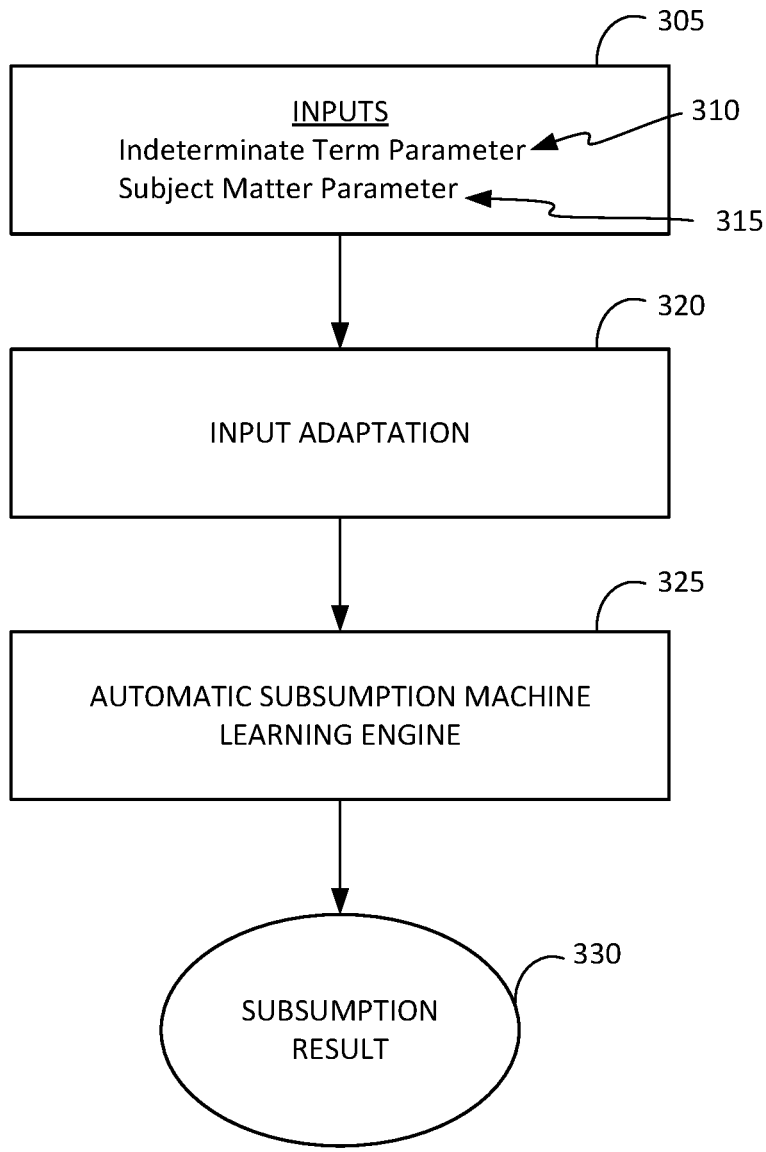
FIG. 3 is an illustrative flow diagram of a subsumption process, in accordance with an example embodiment.

FIG. 3 is an illustrative flow diagram 300 including a subsumption process, in accordance with an example embodiment. At operation 305, process 300 receives textual inputs concerning an interpretation of one or more terms. The inputs may include an indeterminate term parameter 310 value and a subject matter parameter 315 value. In some aspects, the indeterminate term parameter and a subject matter parameter may each be represented in an ontology.

As used herein, an ontology is a special kind of data model for knowledge representation. Modeling elements of an ontology may include classes (e.g. "Personal Data"), relations between classes (e.g., a relation "identifies" between "Personal Data" and "Natural Person"), and instances of classes (e.g., MyAddress is an instance of Personal Data). Typically, ontologies may be visualized as a graph, where classes and instances thereof are nodes in the graph and relations are edges between the nodes. Accordingly, an ontology may be represented as a set of triples (x, y, z) such as, for example, (MyAddress, is instance of, Personal data). Furthermore, concepts, relations, and instances might be identified and represented as URIs, such as, for example, (myname@myhost.com, http://somehost/instance-of, http://somehost/personal-data). As an abbreviation, the namespace syntax is used (myhost:myname, somehost:instance-of, somehost:personal-data) to make the triples more readable.

In some embodiments, the present disclosure foresees two ontologies—one ontology to represent the subject matter domain and one ontology to capture the indeterminate terms domain.

In the simple yet illustrative example of data privacy introduced above, the subject matter ontology may contain classes to represent persons and their addresses. The indeterminate terms ontology may feature classes to represent legal terms of the pertinent data privacy act, such as, "personal data" or "collection" and their interrelationships.

In the more elaborate, illustrative example of the smart grid also introduced above (e.g., FIG. 2), the subject matter ontology may contain classes to represent smart meters, their owners, energy providers, consumption, etc. The corresponding indeterminate terms ontology might represent legal terms of the example Energy Act which, in part, also specializes a Data Privacy Act.

Referring to FIG. 3 again, the set of input textual data received at operation 305 is processed through an input adaption process 320 in preparation for an automatic subsumption process 325. The input adaptation phase of process 300 may include transforming the indeterminate term parameter and the subject matter parameter values of the input into a configuration or representation that may be readily processed by the machine learning phase or operation 325, wherein an output of the machine learning aspect of operation 325 will be a subsumption result 330.

Figure 4:
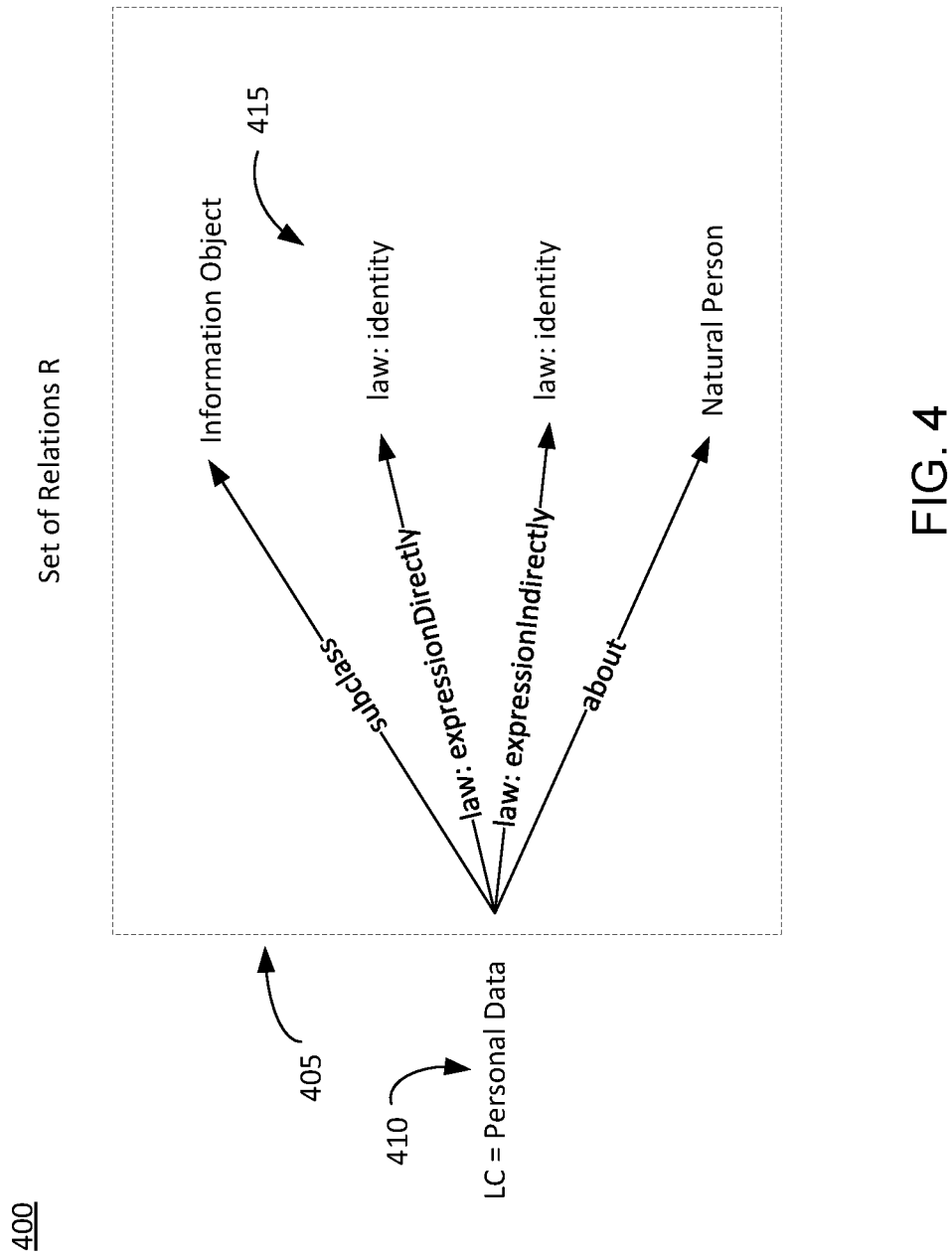
FIG. 4 is an illustrative depiction of a vector representation for an input of an indeterminate term parameter value, in accordance with an example embodiment.

In some aspects, the structure of the input(s) includes the "subject matter" parameter 315 and the "indeterminate legal term" parameter 310 (e.g., in the context of the legal regulation of the present examples), where values for each parameter may be represented in their own ontology or data model. FIG. 4 is an illustrative graphical representation, for the "data privacy" example, of the indeterminate legal term or concept (LC) of "Personal Data" 410, wherein this indeterminate term is part of a statutory ontology or data model 405 about data privacy and has an associated set of relations R shown at 415. In this particular example, the set of relations includes Personal Data expressesDirectly Identity
Personal Data expressesIndirectly Identity
Personal Data about Natural Person In some embodiments, this and other inputs may generally be represented as a set of 3-dimensional vectors (or triples) wherein an indeterminate legal concept or term={(LC, R, c)| where LC and c are legal concepts or terms in the statutory ontology, R is a relation in a statutory ontology}.

In some aspects, each concept/term and every relation might also or alternatively be represented by a unique URI, each of which may be reduced to a natural number by a hash function (or other technique).

In some embodiments, the set of 3 vectors represented in graphical form in FIG. 4 might be represented as a 3×n matrix, where n is the number of defined relations on LC. Continuing with the same example of FIG. 4, n would be 3 and the input vectors might be represented in matrix form as follows:

"indeterminate legal concept (term)"={(http://somehost/foundationalontology/PersonalData, http://www.w3.org/1999/02/22-rdf-syntax-ns#type, http://somehost/foundationalontology/InformationObject), (http://somehost/foundationalontology/PersonalData, http://somehost/legalontology/expressesDirectly, http://somehost/legalonotology/Identity), (http://somehost/legalontology/PersonalData, http://somehost/legalontology/expressesIndirectly, http://somehost/legalontology/Identity), (http://somehost/legalontology/PersonalData, http://somehost/foundationalontology/about, http://somehost/foundationalontology/NaturalPerson)}.

As seen above, the URIs feature 2 namespaces, including concepts (i.e., terms) and relations belonging to the statutory ontology in one namespace (e.g., informationObject) and the general concepts and relations (e.g., Natural Person) in another namespace.

Figure 5:
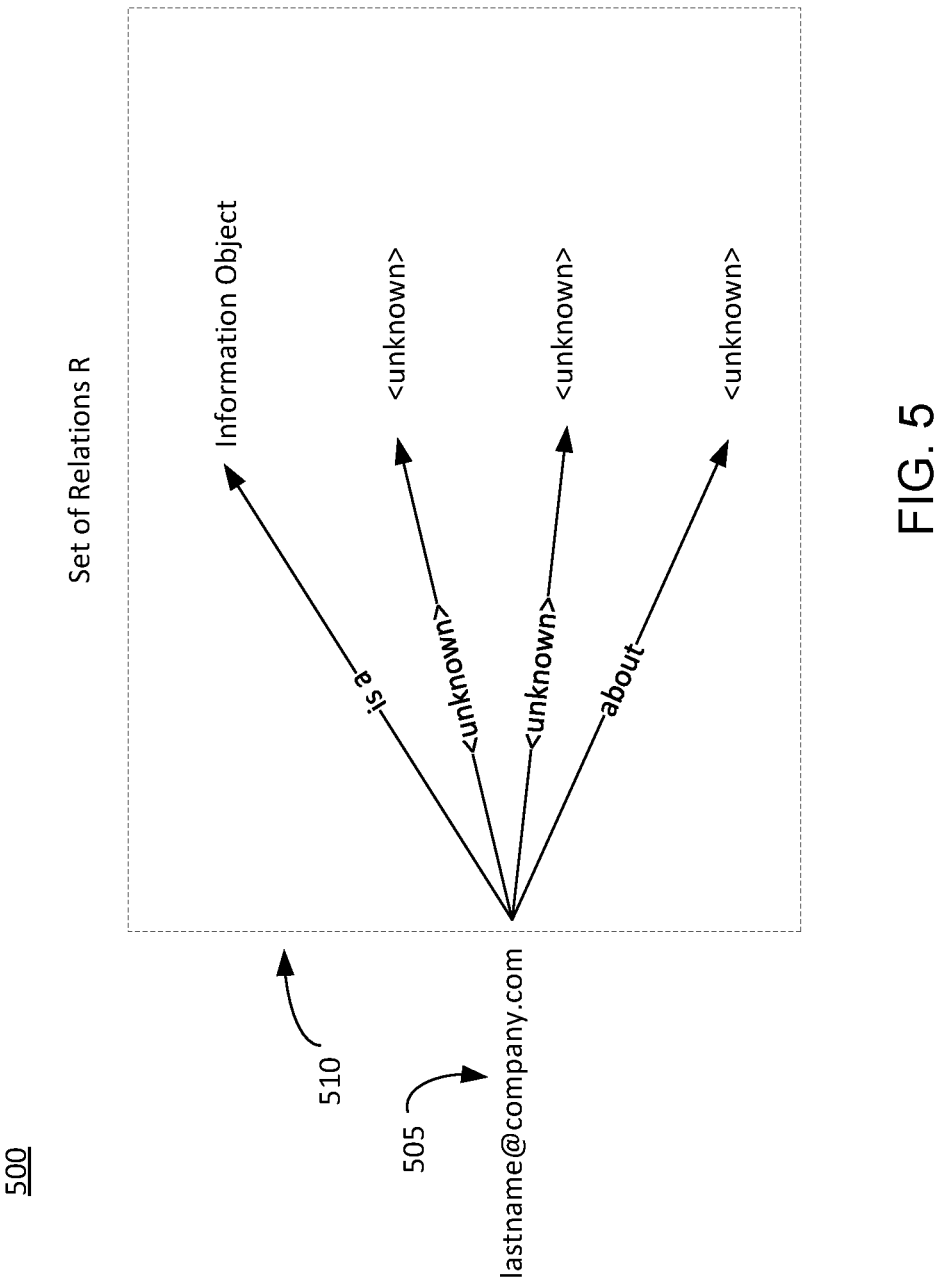
FIG. 5 is an illustrative depiction of a vector representation for input of a subject matter parameter value, in accordance with an example embodiment.

Referring to the "subject matter" input parameter of the "data privacy" example introduced above, for the subject matter there is an email address and we know that this is an "information object" about something or somebody. However, we do not know whether the subject matter directly or indirectly identifies a natural person. Accordingly, an incomplete matrix of the same structure and dimension as the "indeterminate legal concept (term)" matrix may be constructed for the "subject matter" parameter. A graphical, vector representation for the subject matter is shown in FIG. 5, where all of the unknown relations and concepts are represented by a special URI (e.g., "unknown"). In some aspects, a hash function may map this special URI to a reserved number (e.g., 0).

In some embodiments, an adaptation of both of the input parameters (i.e., indeterminate term parameter and subject matter parameter) as described herein might support one or more different types of machine learning. The machine learning may yield a subsumption result that indicates whether the term(s) of interest (e.g., email address) are subsumed in the specified legal term domain ontology. If the term(s) are determined to be subsumed in the specified legal, statutory domain ontology at operation 325, operation 325 is further executed to determine a correspondence between the indeterminate legal term parameter value (e.g., Personal Data) and the subject matter parameter value (e.g., email address). The subsumption result output by process 300 might be used in a combination of different interpretations (e.g., literal, systemic, historical, and teleological) that may be automatically executed for each indeterminate legal term to generate a non-arbitrary interpretation or definition of the indeterminate legal term, as shown in FIG. 1 (e.g., 110-130).

Some aspects of the automated subsumption process or operation 325 may be further disclosed with respect to the architecture of FIG. 1 and other drawings below. Referring again to FIG. 1, the combination of different interpretations includes literal interpretation process component 110. Some further aspects of this particular interpretation process are illustratively depicted in FIG. 6 including a UI 600, where UI 600 refers to "smart grid" and energy law problem. UI 600 includes a representation of the literal meaning or common understating of the term "acquisition" that may correspond to the legal term "collection" being interpreted in the present "smart grid" example. In UI 600, the common understanding of the term "acquisition" is based on a general dictionary entry for the term, as shown at 605 since this term is a word that is a commonly used in the general language domain. The left side of UI 600 at 610 explains that the common understanding shown at 605 (i.e., literally) has to be used for the interpretation of the legal definition of the term "collection" in the literal interpretation process 110.

UI 600 further includes a graphical presentation of a definition of the term "acquisition", where boxes 615, 620, and 625 represent legal terms and boxes 630, 635, 640, and 645 represent common terms. Box 615 represents the legal term "collection" as defined in the examined regulation (identified at 617). As presented in FIG. 6, "collection" 615 is an "acquisition" 630 that is an "action" 635 executed by "natural person" 640 or an "organization" 645. As further depicted in UI 600, the common term definition for "acquisition" pertains just to natural persons 640 or organizations 645 as actors. Accordingly, the same limitations will apply to the literal interpretation of the legal term "collection". However, an actual use-case or context for the legal term "collection" in the present smart grid example is a "smart meter" measurement device that collects or acquires power consumption data. As such, a smart meter is a designed entity that is neither a natural person nor an organization. Therefore, the literal interpretation process 110 does not provide a definitive, non-arbitrary definition or interpretation result for the term of interest (i.e., the indeterminate term parameter value="collection").

In some aspects, as illustrated in FIG. 1, literal interpretation 110 might use a link retrieval component or service 140 that obtains links that point to common term definitions 155 in, for example, online dictionaries for literal interpretation operation or component 110. In some embodiments, link retrieval component or service 140 may use machine learning processes or algorithms to find the most suitable or appropriate definition for a term. In some regards, machine learning may be leveraged in retrieving or otherwise generating links to common term definitions to determine a best-fit definition or meaning for a given subject matter since one particular term might have more than one common term.

Referring to FIG. 1, another type of interpretation process or canon is a systemic interpretation process or component 115, wherein a term of interest being interpreted is evaluated based on or relative to other provisions (e.g., terms, paragraphs, phrases, terms, etc.) in a regulation. In some instances, a legal or other term might be better understood when interpreted in view of other provisions of the regulation. In some instances, a term might be referenced or mentioned in a first regulation even though a definition for the term might be included in a different provision (e.g., section, paragraph, etc.) of a same regulation or in a different regulation. In some cases, a definition for a term may be further focused or refined by another, more specific provision (e.g., a general, country-wide applicable regulation having a broadly defined term may be associated with a more focused regulation for a specific town that further refines the broad definition for the term).

Figure 7:
FIG. 7 is an illustrative diagram of an outward facing user interface related to a systemic interpretation process, in accordance with an example embodiment.

In some embodiments, some aspects of a systemic interpretation process 115 herein are illustratively depicted in FIG. 7 including a UI 700. UI 700 includes, at 715, the norms regarding the legal meaning or definition of the term "collection" as specified in an Energy Act as shown at 705 and as also specified in a Privacy Act at 707. Referring to the two provisions 705 and 707, the "lawfulness" or legal meaning as specified in Energy Act 705 may be regarded as a special case of the lawfulness of the term "collection" specified in Privacy Act 707. In some aspects, when considering two or more definitions for a term in a systemic interpretation process herein, the two or more analyzed norms may not have contradictory meanings or consequences for the term being interpreted.

Referring to UI 700 again, the automatic systemic interpretation process 115 herein provides statement(s) 710 that inform a user that the interpretation of the term "collection" based on multiple different norms cannot result in contradictory legal consequences. Statements 715 inform a user of the particular legal (or other) term being interpreted and the particular norm or provision in which the term is specified. Instruction 720 informs a user of a functionality of the system to check whether extending the interpretation of "acquisition" to include a smart meter as an actor will result in contradictions regarding the cited norms.

Figure 8:
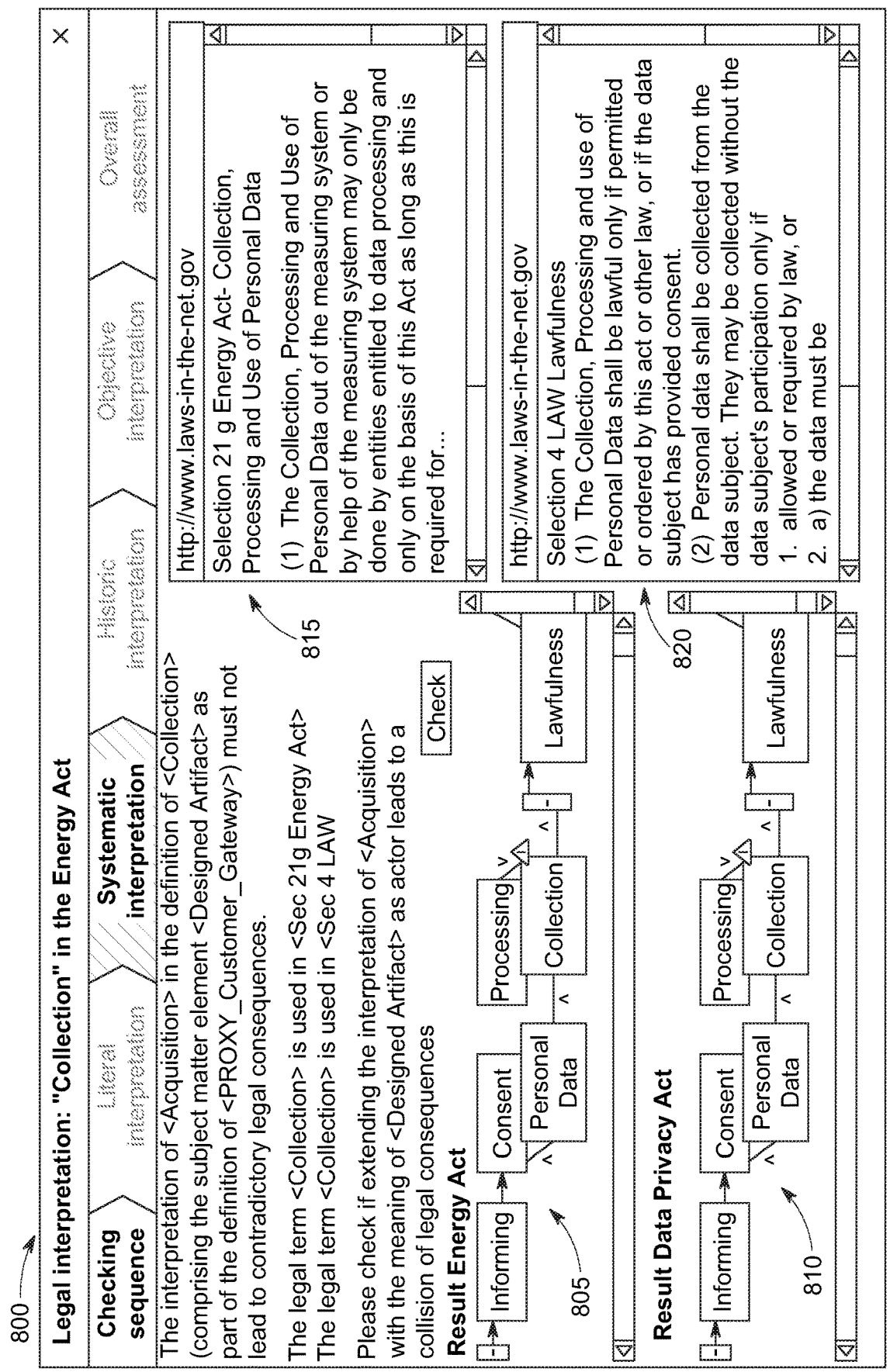
FIG. 8 is an illustrative diagram of a norm graph related to a systemic interpretation process, in accordance with an example embodiment.

In response to a user selection of UI element (i.e., button) 725 to invoke the system to check for contradictions in the systemic interpretation of "acquisition", norm graphs are generated as depicted in UI 800 of FIG. 8. For the generated norm graphs 805 and 810, the graphical boxes comprising the norm graphs represent legal terms in the respective regulations (e.g., the Energy Act for graph 805 and the Data Privacy Act for graph 810) and each box includes the source (e.g., regulation, section, etc.) of the definition for the respective legal term represented by the box. Edges between boxes represent logical operators between legal terms (e.g., AND, OR, IF . . . THEN etc.). On the very right of each graph is the legal consequence (e.g., "lawfulness", also a legal term). In some aspects, the norm graph is a formalization of a legal IF . . . THEN rule defined in natural language in a norm. Norm graph 805 is a graphical representation of the legal consequence for lawfulness of the term "collection" in the context of the Energy Act 815 and norm graph 810 is a graphical representation for lawfulness of the term "collection" in the more general Privacy Act 820. In the examples of norm graphs 805 and 810, there is an exclamation point icon that indicates that there is a conflict in defining the term "collection" based on the two cited norms.

Figure 9:
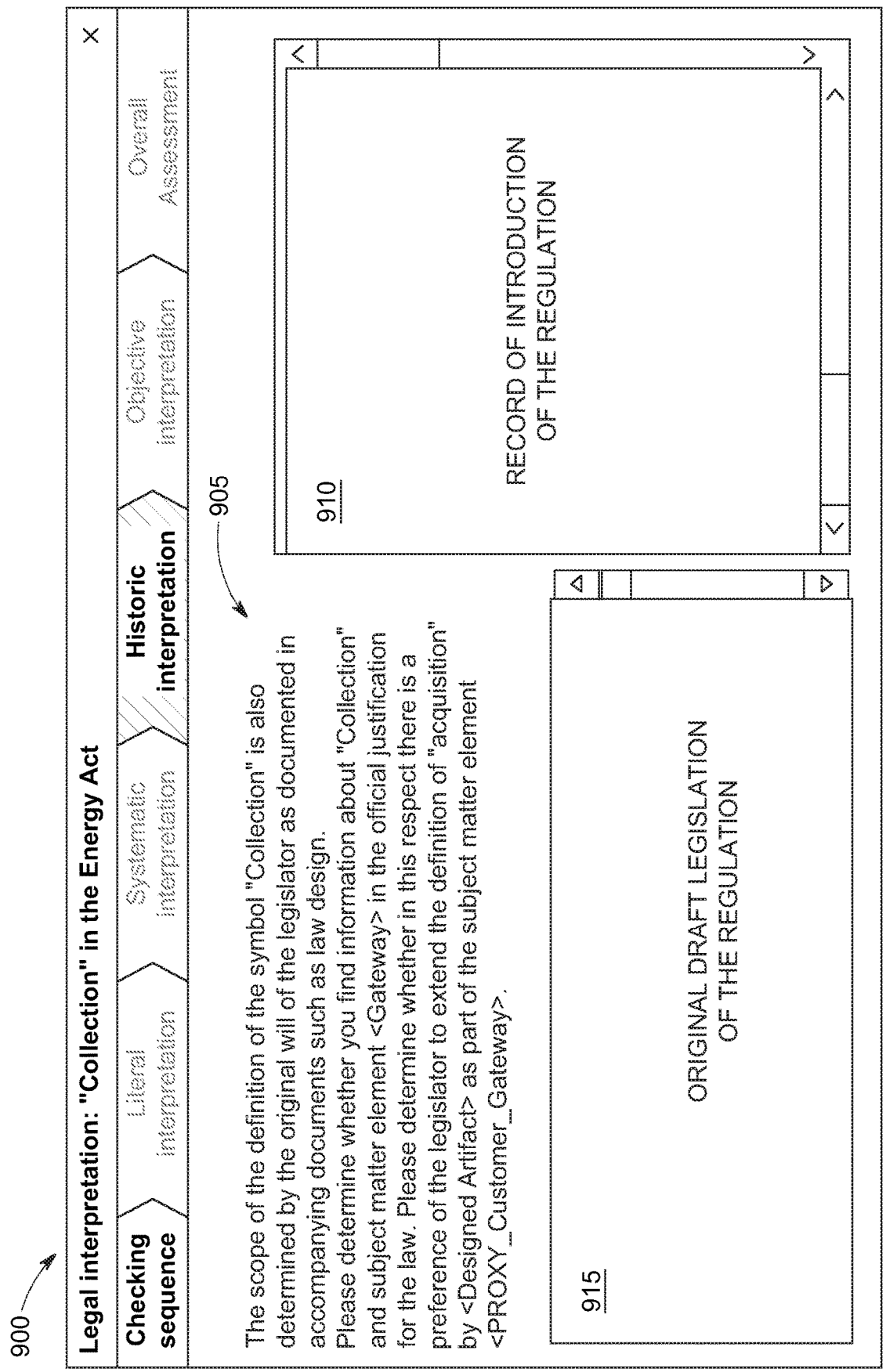
FIG. 9 is an illustrative diagram of an outward facing user interface related to a historical interpretation process, in accordance with an example embodiment.

Referring again to FIG. 1, another type of interpretation or canon, namely a historical interpretation process 120 is also shown in architecture 100. Corresponding thereto in FIG. 9 is an illustrative example depiction of a UI 900 for the historic interpretation process 120 of FIG. 1. In the present smart grid example, we recall that the common term definition of "acquisition" that is used in the legal definition of "collection" refers to natural persons or organizations as actors, whereas in the relevant the Energy Act, a Smart Meter device (neither a natural person nor an organization) may perform the collection/acquisition of data. In a continuing effort to determine whether the indeterminate term "collection" should have an extended interpretation relative to the common term interpretation in "acquisition", an embodiment of the indeterminate term interpretation process supported by architecture 100 further obtains and presents documents related to the original (i.e., historical) justification of the law (or other regulation) by the drafter(s) of the regulation.

UI 900 includes at 905 introductory and explanatory text explaining, in part, that the scope of the definition of the term "collection" may be further interpreted based on a consideration of the original or initial will of the drafters of the regulation in which the term is derived. Additionally, historical documents and other records may be presented in UI 900 that are related to (e.g., capture or document, etc.) the intent of the drafters of the relevant regulation(s) (e.g., laws). In the example of FIG. 9, document 915 is a presentation of the original draft legislation for the Energy Act regulation and document 910 is a presentation of the relevant legislature's document and information service that is the first documented record introducing a regulation for the regulation of energy that eventually resulted in the Energy Act. Documents 915 and/or 910 may include references to other related documents, where navigation to other related documents may be accomplished in a chronological order. In some aspects, a link retrieval component or service 145 might operate to obtain links that point to documents and or other records of original justifications of a regulation for historical interpretation operation or component 120. In some embodiments, link retrieval component or service 145 may use machine learning processes or algorithms to find the most suitable or appropriate sources of the historical records including the intent or will of the drafters of the relevant regulation for an indeterminate term. In some aspects, machine learning may, over time, "learn", anticipate, and predict were to find records that might include historical accounts and recollections of the drafter's original will and intent.

Referring again to FIG. 1, an objective or teleological interpretation process (i.e., canon) or component 125 is shown in architecture 100. Statutory provisions may generally be enacted with a particular protective purpose in mind. For example, a data privacy regulation may be concerned with the right for informational self-determination of a data subject. The objective-teleological interpretation process or component 125 might operate to capture the protective purpose of a particular provision or regulation associated with a term being interpreted in some embodiments herein.

Figure 10:
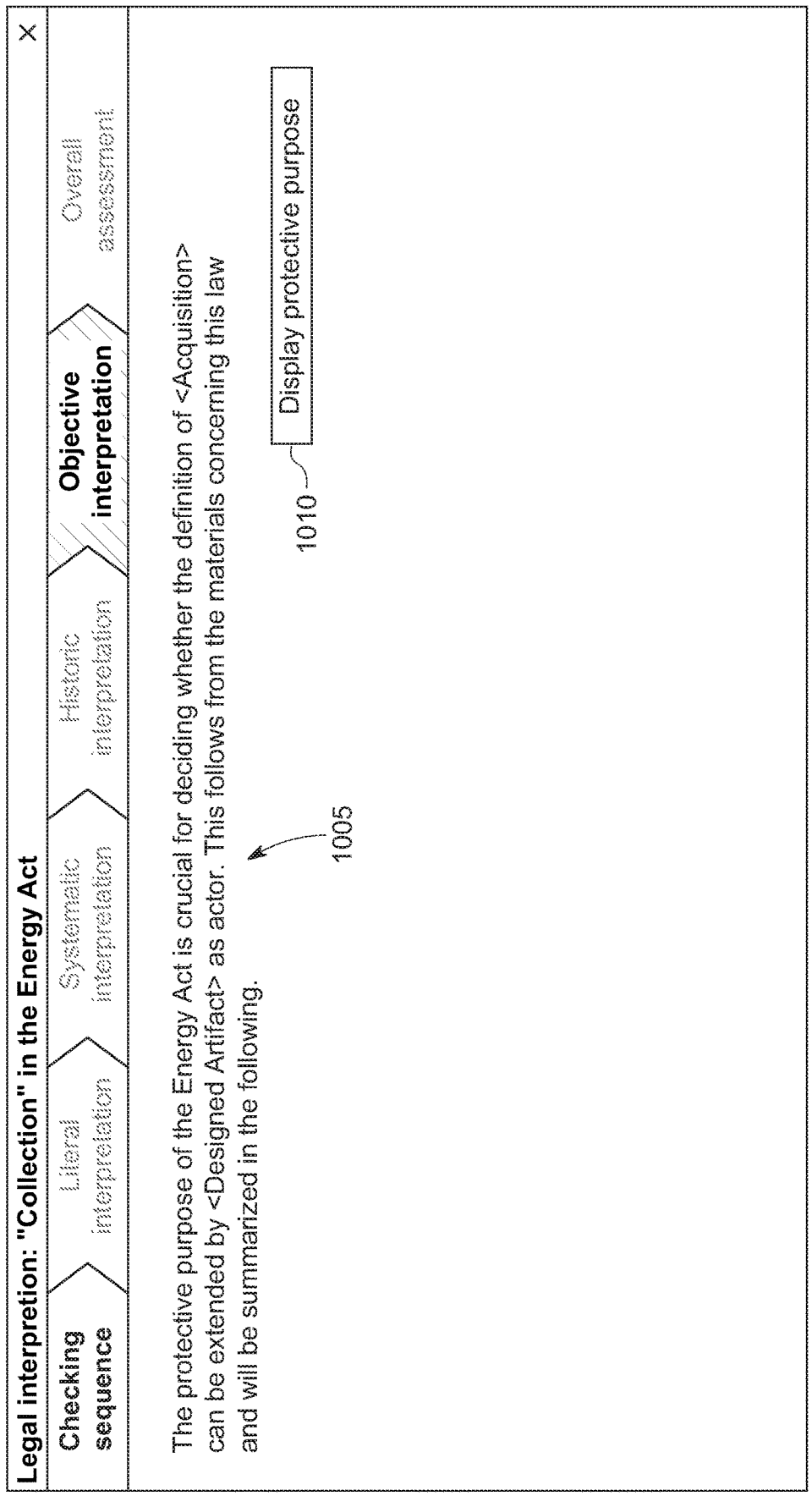
FIG. 10 is an illustrative diagram of an outward facing user interface related to an objective-teleological interpretation process, in accordance with an example embodiment.
Figure 11:
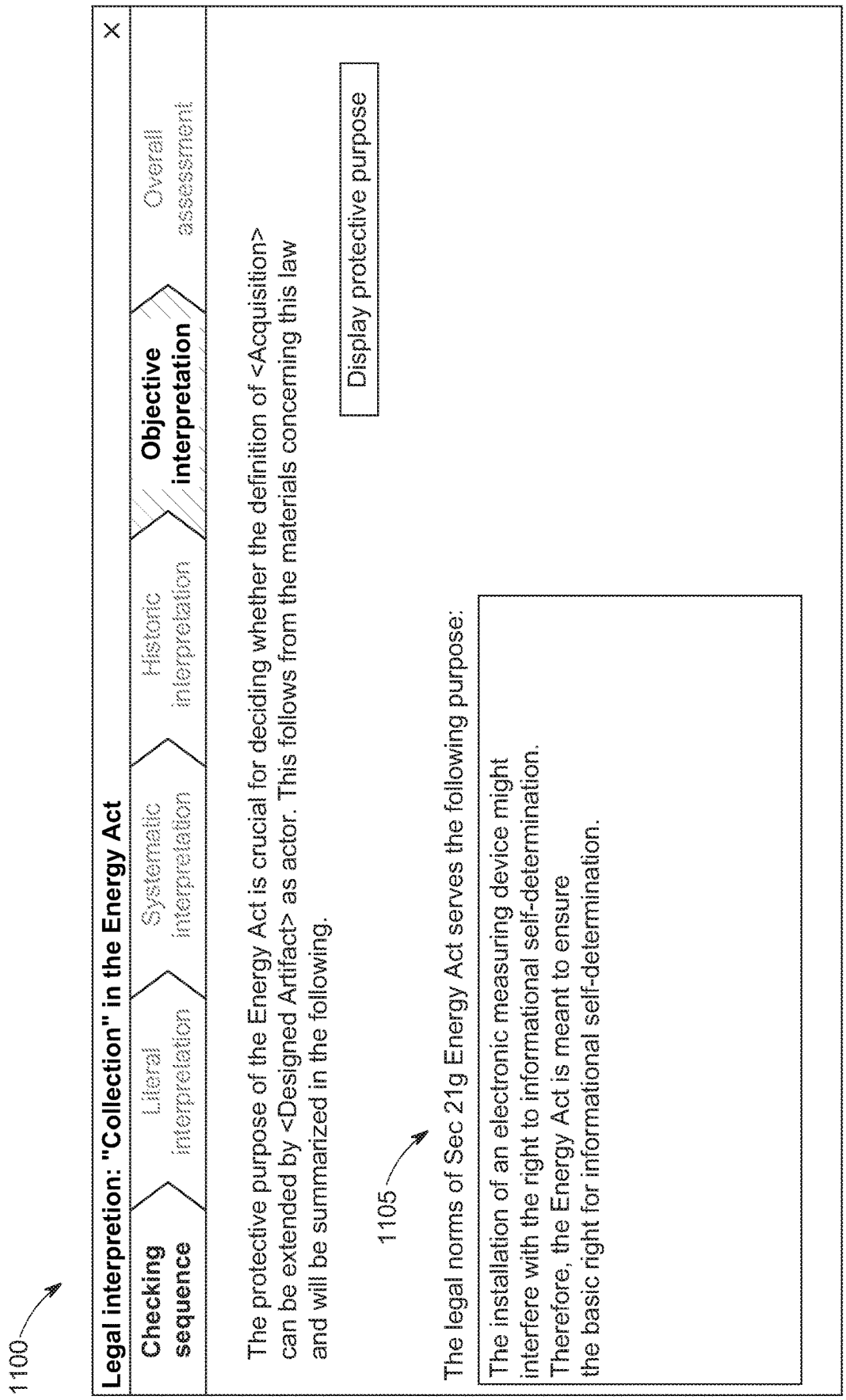
FIG. 11 is an illustrative diagram of an outward facing user interface related to some aspects of an objective-teleological interpretation process, in accordance with an example embodiment.

FIG. 10 is an illustrative depiction of a UI 1000 including an introductory page for the objective-teleological interpretation process or component 125 that presents an overview 1005 of this particular interpretation process. UI 1000 includes a UI element 1010 that may be selected by a user to invoke the objective-teleological interpretation process, in some embodiments. In some aspects, the teleological interpretation process herein might operate to, for example, ascertain, determine, or otherwise present the original purpose, goal, or objective to be achieved by a particular regulation (e.g., an Energy Act in one example herein). In some regards, the objective-teleological interpretation process herein may be a significant component of the overall interpretation process herein since, for example, the interpretation of a term herein should be in accordance with and support and/or contribute to the original purpose, goal, or objective of a relevant regulation. In response to a user selection of UI element 1010, UI 1100 of FIG. 11 may be presented on a display device to inform a user of the original purpose of the relevant regulation. In the present smart grid example, the regulation is an Energy Act and the original purpose for this regulation is recorded/documented to be, for example, "The installation of an electronic measuring device might interfere with the right to informational self-determination. Therefore, the Energy Act is meant to ensure the basic right for informational self-determination", as shown at 1105.

An interpretation of terms including a combination of different interpretation components or processes (i.e., canons) as described herein may be used to further produce an overall assessment of the combination of different interpretation processes (e.g., FIG. 1, processes 110-125). System architecture 100 of FIG. 1 includes an overall assessment component or process 130 that might operate to generate, for each evaluated indeterminate term, a non-arbitrary definition for the term. In some embodiments and use-cases, there may be a constraint on system 100 that a generated interpretation is free of uncertainty. In some use-cases or applications, this constraint itself might be the requirement of a particular regulation (e.g. law). UI 1200 of FIG. 12 may be an example of an illustrative interface presentation displayed to a user upon a conclusion of the combination of interpretation processes 110, 115, 120, and 125. In some aspects, an overall assessment might serve as a summary of the execution of the multiple different interpretation processes. In particular, UI 1200 might inform a user at 1205 that:

You have to decide whether <Acquisition> can be extended by <Designed Artefact> as actor according to the original intention of the Energy Act. You have to decide under consideration of the literal, systematic, historic and objective-teleological interpretation elaborated in the previous steps.

Figure 12:
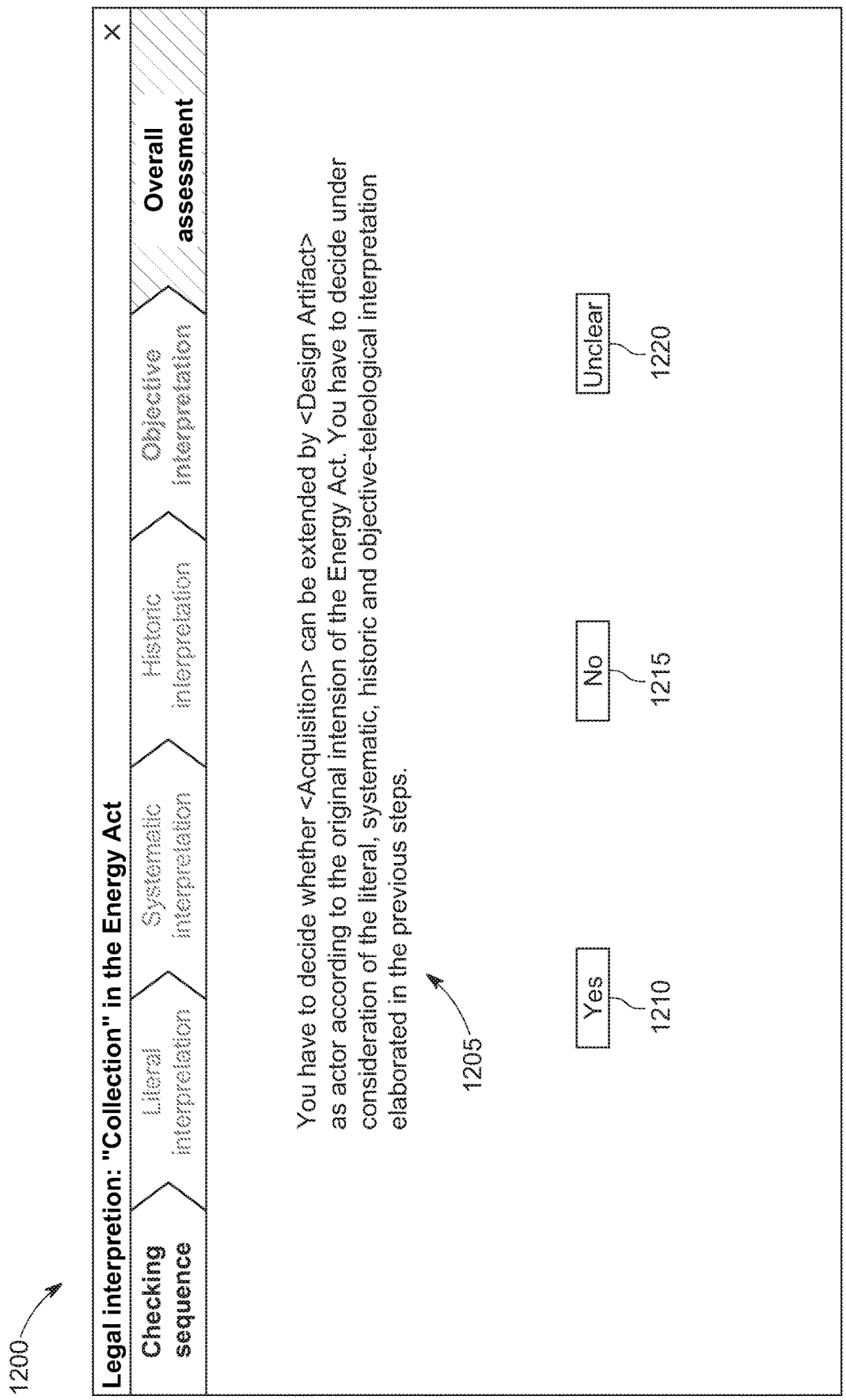
FIG. 12 is an illustrative diagram of an outward facing user interface related to an overall assessment process, in accordance with an example embodiment.
Figure 14:
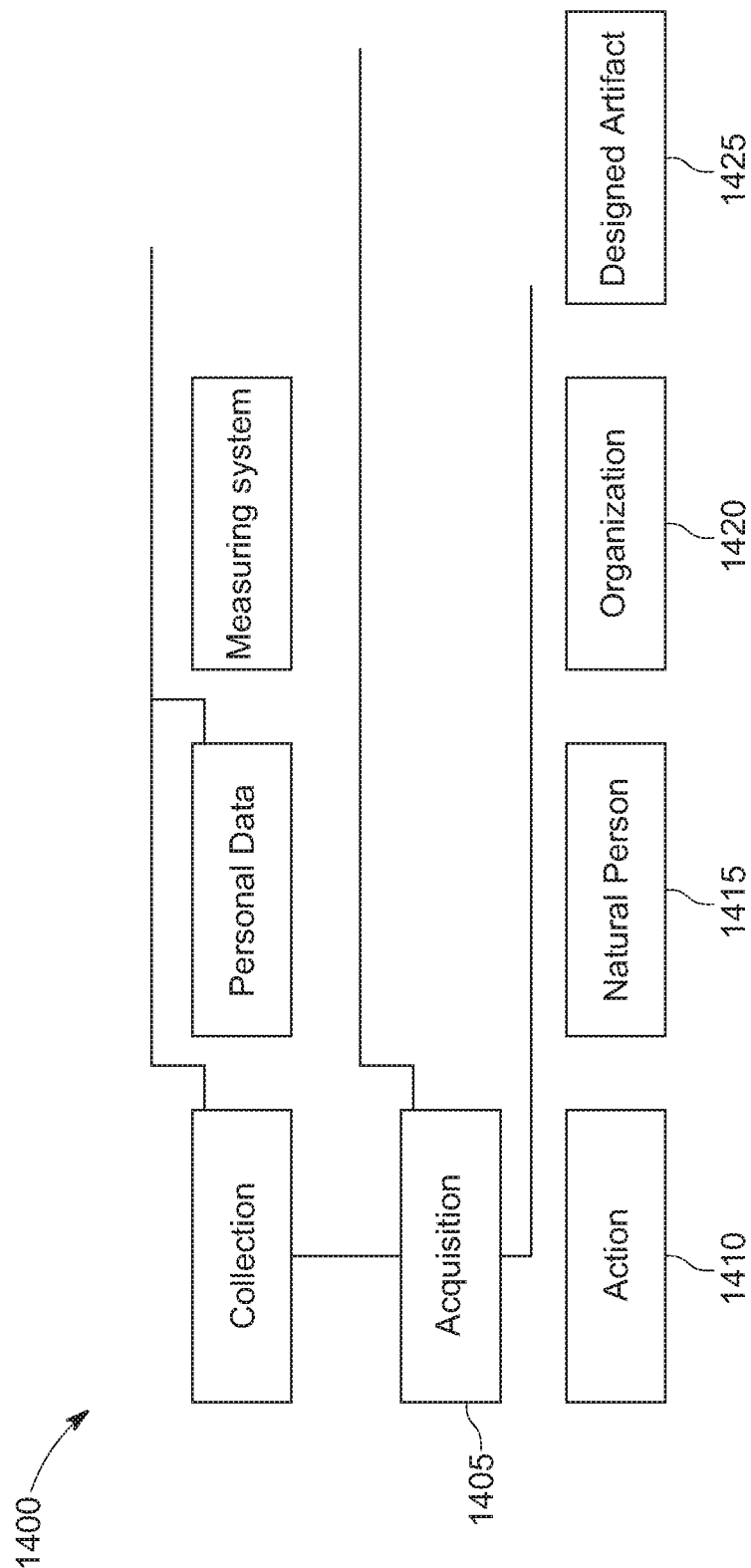
FIG. 14 is an illustrative diagram of an outward facing user interface including a presentation of a set of terms expanded to include a non-arbitrary interpretation generated by a process herein, in accordance with an example embodiment.

The example UI 1200 provides a number of interactive UI elements, namely UI buttons 1210 "Yes", 1215 "No", and 1220 "Unclear". If the user selectively clicks the "Unclear" button 1220, a UI dialogue element 1305 might open as shown in FIG. 13 that displays, as an example, the message dialog of "Please notify or consult your legal department". In some aspects, selection of the "unclear" button 1220 in FIG. 12 is an indication that the user does not, despite the support and determination of an interpretation of the indeterminate term provided by system 100, fully understand the meaning of the subject indeterminate term. That is, the user does not feel capable of deciding the issue even with the help of the automated interpretation support. In the event the user selects the "Yes" button 1210 in UI 1200, the definition of <Acquisition> will be extended by <Designed Artifact> (i.e., smart meter) as an actor. As a consequence, <Acquisition> is no longer a common term, but instead will be interpreted in this particular way in the context of the Energy Act. FIG. 14 includes an illustrative depiction 1400 of a graphical representation of the resulting definition after selecting "Yes" in UI 1200. As seen in FIG. 14, the box representing <Acquisition>is labelled with the Energy Act as namespace. Moreover, the term "Acquisition" 1405 is defined to be an "Action" 1410 that is now executed by either a "natural person" 1415, an "organization" 1420, or a "designed artifact" (e.g., a smart meter) 1425.

Figure 15:
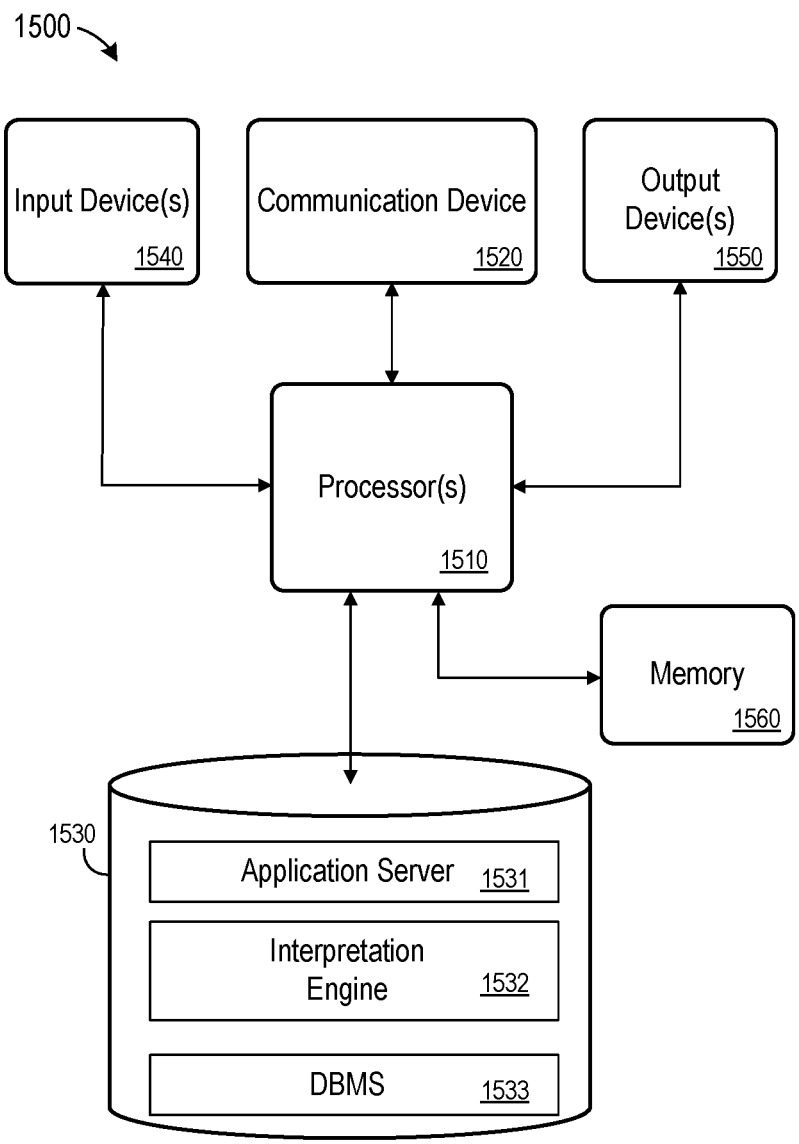
FIG. 15 is an illustrative block diagram of a computing system, in accordance with an example embodiment.

FIG. 15 illustrates a computing system 1500 that may be used in any of the methods and processes described herein, in accordance with an example embodiment. FIG. 15 is a block diagram of server node 1500 embodying a central extension hub, according to some embodiments. Server node 1500 may comprise a general-purpose computing apparatus and may execute program code to perform any of the functions described herein. Server node 1500 may comprise an implementation of at least some features of architecture 100 of FIG. 1 in some embodiments. Server node 1500 may include other unshown elements according to some embodiments.

Server node 1500 includes processing unit(s) 1510 operatively coupled to communication device 1520, data storage device 1530, one or more input devices 1540, one or more output devices 1550, and memory 1560. Communication device 1520 may facilitate communication with external devices, such as an external network or a data storage device. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into apparatus 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM).

Application server 1532 may each comprise program code executed by processor(s) 1510 to cause server 1500 to perform any one or more of the processes described herein. Interpretation engine 1532 may execute one or more of the different types of term interpretations in combination as disclosed herein. Embodiments are not limited to execution of these processes by a single computing device. Data storage device 1530 may also store data and other program code for providing additional functionality and/or which are necessary for operation of server 1500, such as device drivers, operating system files, etc. DBMS 1533 may store and manage a variety of data types and structures, including, for example, formalized subject matter, links to common term definitions, formalized term definitions, formalized norm graphs, links to original justifications of a regulation, and other data.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processor to execute the processor-executable program code in order to cause the system to:
      receive an input of a set of textual terms, the set of textual terms including a subject matter parameter value and an indeterminate term parameter value;
      automatically determine, by a machine learning process, whether the subject matter parameter value is subsumed within a data model including the indeterminate term parameter value to determine a correspondence between the subject matter parameter value and the indeterminate term parameter value;
      automatically process the indeterminate term parameter value to execute a literal interpretation thereof based on a commonly accepted definition of the indeterminate term;
      automatically process the indeterminate term parameter value to execute a systemic interpretation thereof based on definitions of other terms within a regulation related to the indeterminate term;
      automatically process the indeterminate term parameter value to execute a historical perspective interpretation thereof based on one or more historical records related to an original justification for a regulation related to the indeterminate term;
      automatically process the indeterminate term parameter value to execute a teleological interpretation thereof based on an original objective purpose to be served by the indeterminate term;
      generate an overall assessment of the executed literal, systemic, historical perspective, and teleological interpretations of the indeterminate term parameter value, the overall assessment including a non-arbitrary interpretation of the indeterminate term parameter value; and
      present a representation of the set of textual terms expanded to include the non-arbitrary interpretation of the indeterminate term parameter value.

2. The system of claim 1, further comprising the processor to execute the processor-executable program code in order to cause the system to transform the received input set of textual terms into a configuration compatible with the machine learning process that automatically determines whether the subject matter parameter value is subsumed within the specified data model including the indeterminate term parameter value.

3. The system of claim 1, wherein the machine learning process includes representing both the subject matter parameter value and the indeterminate term parameter value each as a set of triples.

4. The system of claim 1, wherein the set of input textual terms includes a plurality of indeterminate term parameter values and the literal, systemic, historical perspective, and teleological interpretations are executed for each of the plurality of indeterminate term parameter values, independent of each other.

5. The system of claim 1, wherein the execution of at least one of the literal interpretation and the historical perspective interpretation references sources identified by a link retrieval component.

6. The system of claim 5, wherein at least one of the literal interpretation and the historical perspective interpretation includes a machine learning based analysis applied by the link retrieval component.

7. The system of claim 1, further comprising the processor to execute the processor-executable program code in order to cause the system to present an indication that the overall assessment of the executed literal, systemic, historical perspective, and teleological interpretations of the indeterminate term does not result in a non-arbitrary interpretation of the indeterminate term parameter value.

8. A computer-implemented method, the method comprising:
receiving an input of a set of textual terms, the set of textual terms including a subject matter parameter value and an indeterminate term parameter value;
automatically determining, by a machine learning process, whether the subject matter parameter value is subsumed within a data model including the indeterminate term parameter value to determine a correspondence between the subject matter parameter value and the indeterminate term parameter value;
automatically processing the indeterminate term parameter value to execute a literal interpretation thereof based on a commonly accepted definition of the indeterminate term;
automatically processing the indeterminate term parameter value to execute a systemic interpretation thereof based on definitions of other terms within a regulation related to the indeterminate term;
automatically processing the indeterminate term parameter value to execute a historical perspective interpretation thereof based on one or more historical records related to an original justification for a regulation related to the indeterminate term;
automatically processing the indeterminate term parameter value to execute a teleological interpretation thereof based on an original objective purpose to be served by the indeterminate term;
generating an overall assessment of the executed literal, systemic, historical perspective, and teleological interpretations of the indeterminate term parameter value, the overall assessment including a non-arbitrary interpretation of the indeterminate term parameter value; and
presenting a representation of the set of textual terms expanded to include the non-arbitrary interpretation of the indeterminate term parameter value.

9. The method of claim 8, further comprising the processor to execute the processor-executable program code in order to cause the system to transform the received input set of textual terms into a configuration compatible with the machine learning process that automatically determines whether the subject matter parameter value is subsumed within the specified data model including the indeterminate term parameter value.

10. The method of claim 8, wherein the machine learning process includes representing both the subject matter parameter value and the indeterminate term parameter value each as a set of triples.

11. The method of claim 8, wherein the set of input textual terms includes a plurality of indeterminate term parameter values and the literal, systemic, historical perspective, and teleological interpretations are executed for each of the plurality of indeterminate term parameter values, independent of each other.

12. The method of claim 8, wherein the execution of at least one of the literal interpretation and the historical perspective interpretation references sources identified by a link retrieval component.

13. The method of claim 12, wherein at least one of the literal interpretation and the historical perspective interpretation includes a machine learning based analysis applied by the link retrieval component.

14. The method of claim 8, further comprising the processor to execute the processor-executable program code in order to cause the system to present an indication that the overall assessment of the executed literal, systemic, historical perspective, and teleological interpretations of the indeterminate term does not result in a non-arbitrary interpretation of the indeterminate term parameter value.

15. A non-transitory, computer readable medium storing instructions, which when executed by at least one processor cause a computer to perform a method comprising:
receiving an input of a set of textual terms, the set of textual terms including a subject matter parameter value and an indeterminate term parameter value;
automatically determining, by a machine learning process, whether the subject matter parameter value is subsumed within a data model including the indeterminate term parameter value to determine a correspondence between the subject matter parameter value and the indeterminate term parameter value;
automatically processing the indeterminate term parameter value to execute a literal interpretation thereof based on a commonly accepted definition of the indeterminate term;
automatically processing the indeterminate term parameter value to execute a systemic interpretation thereof based on definitions of other terms within a regulation related to the indeterminate term;
automatically processing the indeterminate term parameter value to execute a historical perspective interpretation thereof based on one or more historical records related to an original justification for a regulation related to the indeterminate term;
automatically processing the indeterminate term parameter value to execute a teleological interpretation thereof based on an original objective purpose to be served by the indeterminate term;
generating an overall assessment of the executed literal, systemic, historical perspective, and teleological interpretations of the indeterminate term parameter value, the overall assessment including a non-arbitrary interpretation of the indeterminate term parameter value; and
presenting a representation of the set of textual terms expanded to include the non-arbitrary interpretation of the indeterminate term parameter value.

16. The medium of claim 15, further comprising the processor to execute the processor-executable program code in order to cause the system to transform the received input set of textual terms into a configuration compatible with the machine learning process that automatically determines whether the subject matter parameter value is subsumed within the specified data model including the indeterminate term parameter value.

17. The medium of claim 15, wherein the machine learning process includes representing both the subject matter parameter value and the indeterminate term parameter value each as a set of triples.

18. The medium of claim 15, wherein the set of input textual terms includes a plurality of indeterminate term parameter values and the literal, systemic, historical perspective, and teleological interpretations are executed for each of the plurality of indeterminate term parameter values, independent of each other.

19. The medium of claim 15, wherein the execution of at least one of the literal interpretation and the historical perspective interpretation references sources identified by a link retrieval component.

20. The medium of claim 19, wherein at least one of the literal interpretation and the historical perspective interpretation includes a machine learning based analysis applied by the link retrieval component.

\* \* \* \* \*